United States Patent
Werner et al.

[11] Patent Number: 5,810,391
[45] Date of Patent: Sep. 22, 1998

[54] SAFETY STEERING WHEEL

[75] Inventors: Heribert Werner, Kahl; Werner Grosser, Sulzbach; Thomas Thein, Sennfeld, all of Germany

[73] Assignee: MST Automotive GmbH, Aschaffenburg, Germany

[21] Appl. No.: 621,756

[22] Filed: Mar. 22, 1996

[30] Foreign Application Priority Data

Mar. 24, 1995 [DE] Germany .................. 195 10 418.8

[51] Int. Cl.[6] .................................................. B60R 21/22
[52] U.S. Cl. ................................................. 280/731; 74/552
[58] Field of Search .................... 280/731, 777, 280/750; 74/552

[56] References Cited

U.S. PATENT DOCUMENTS

| 3,819,205 | 6/1974 | Danford et al. | 280/731 |
| 4,884,823 | 12/1989 | Honda | 280/731 |
| 4,899,613 | 2/1990 | Kawaguchi | 74/552 |
| 5,097,720 | 3/1992 | Drefahl | 74/552 |
| 5,356,178 | 10/1994 | Namata | 280/777 |

*Primary Examiner*—Christopher P. Ellis
*Attorney, Agent, or Firm*—Sprung Kramer Schaefer & Briscoe

[57] ABSTRACT

In a safety steering wheel, the ring and spokes are jacketed in a polyurethane integral foam of which the cap covering the integrated air bag unit is also made. To improve appearances the jacketing and the cap merge materially with one another.

5 Claims, 2 Drawing Sheets

SAFETY STEERING WHEEL

BACKGROUND

The invention relates to a safety steering wheel for street vehicles, especially for passenger automobiles, in which the hub is recessed below the plane of the ring, and into which an airbag unit is integrated which consists of a gas generator, a support connected to the gas generator and fastened on the spokes, a gas bag folded on and/or around the gas generator, and a flange clamped to the support and clamping the gas bag in the marginal area around its gas port. The wheel and the areas of the spokes adjoining the ring are jacketed and the airbag unit has a cap-like covering of thermoplastic, polyurethane or thermoplastic elastomers.

SUMMARY OF INVENTION

The requirement that the severity of injuries to the riders of road vehicles, especially passenger automobiles, due to accident, be reduced by providing passive safety measures, is met especially by the gas bag cushioning unit integrated into the steering wheel of the vehicle and also, in some cases, behind the dashboard on the passenger side. A gas bag cushioning unit of this kind is made up essentially of a gas generator, a generator support, and a gas bag folded around the gas generator. The generator support furthermore serves the purpose of accommodating the flange plate for fastening the gas bag at the marginal area defining the gas inlet port. The generator support also has the purpose of accommodating the flange plate for fastening the gas bag in the marginal area around its gas port. A clamping strip disposed around the generator support grips the gas bag cover made generally of a polyurethane integral foam or a thermoplastic elastomer. Upon any collision with a massive obstacle, acceleration detectors respond which are housed in the front compartment and/or in the passenger space. After a few milliseconds the gas bag begins to inflate when the ignition current is switched to the igniter of the gas generator, which in turn ignites the primer and thus fires the gas charge, so that in 40 to 50 ms the upper torso of the driver strikes against the fully inflated gas bag and the driver thus immediately shares in the retardation of the vehicle, while an acceptable uniform acceleration acts during the delay period (DE-B-2 347 255). It is a disadvantage, however, that in the case of a steering wheel of this kind, the aesthetic impression is adversely affected since there are gaps between the spoke jacketing on the one hand and the covering of the air bag device on the other.

The present invention is addressed to the problem of designing the safety steering wheel described above such that the requirement profile of aesthetics will also be satisfied.

The solution of this problem consists of a safety steering wheel which has the features of claim 1.

Additional embodiments of the steering wheel of claim 1 are to be seen in the fact that the spoke sections joined to the hub are configured as deformation elements and can have the shape described in subordinate claims 3 to 6.

In such a safety steering wheel the technical and aesthetic requirements are advantageously combined in a single concept, while additional collision protection is provided by the fact that the spoke sections connected to the hub serve as deformation elements.

BRIEF DESCRIPTION OF DRAWINGS

The invention is represented by way of example in the drawings and is further explained herewith.

DETAILED DESCRIPTION OF DRAWINGS

Figure 1:
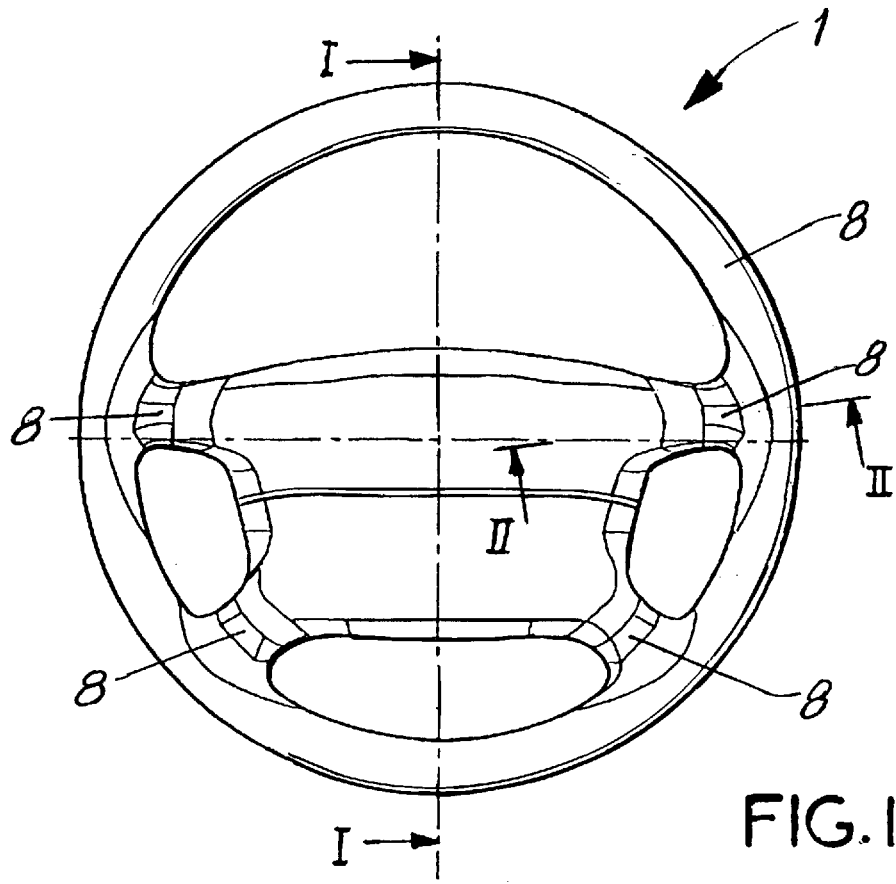
FIG. 1 is a plan view of the front of the steering wheel.
Figure 2:
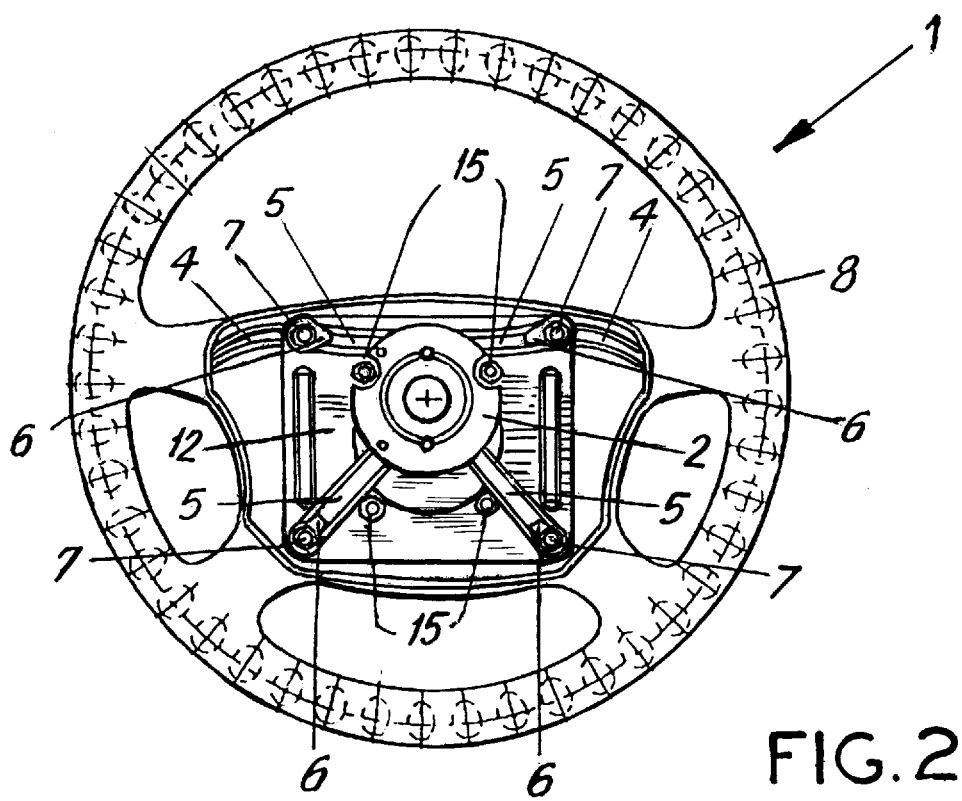
FIG. 2 is a plan view of the back of the steering wheel.
Figure 3:
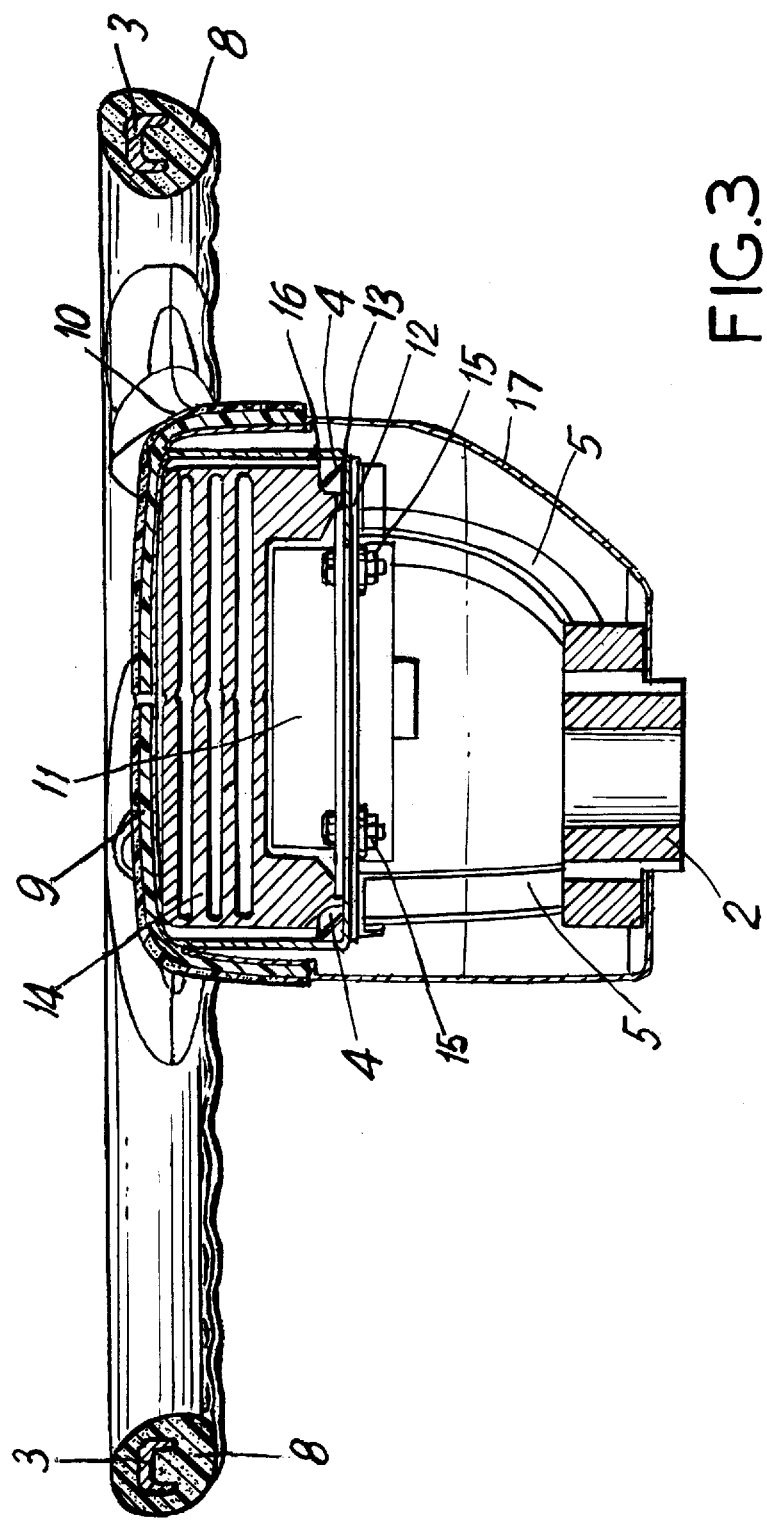
FIG. 3 is a longitudinal section taken through the steering wheel along the section line II—II of FIG. 1.
Figure 4:
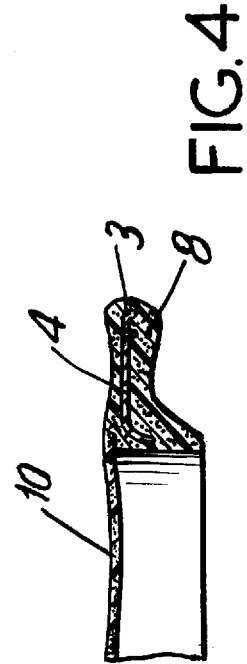
FIG. 4 is a longitudinal section taken through the steering wheel along the section line I—1 of FIG. 1.

In the steering wheel 1 whose hub 2 is recessed below the plane of the ring 3, the spokes each consist of sections 4 and 5, joined to the ring and to the hub 2. The free ends of the spoke sections 4 and 5 provided with links 6 are clamped together by means of bolts 7.

The ring 3 and the portions of the spoke sections 4 adjoining the ring 3 bear a jacket 8 of integral polyurethane foam which merges materially with cap 10 of polyurethane integral foam reinforced by an insert 9 of hard plastic and covering the airbag unit integrated into the steering wheel. The airbag unit consists of the generator support plate 12 joined to the gas generator 11 which is clamped between the links 6 of the clamped-together free ends of the spoke sections 4 and 5 and is joined by bolts 15 to the flange plate 13 for mounting the gas bag 14 folded in several layers on and around the gas generator, in such a manner that the marginal area of the gas bag 14 around the gas inlet port is clamped between the generator support plate 12 and the flange plate 13. A jacket 16 surrounding the folded gas bag 14 is materially joined to the underside of the cap 10 and its free margin on the hub side is bent inward at right angles and clamped between the generator support plate 12 and the spokes. A pot-like shield 17 is clipped to the underside of the hub 2 and the margin of the cap 10 adjacent the latter.

After the jacket 8 for the ring and for the spoke sections as well as the cap 10 have been produced by injection molding, the air bag unit consisting of the gas generator 11, the generator support plate 12, the flange plate 13 and the folded gas bag 14 are inserted into the cavity inside of the jacket 17 joined to the cap 10, and then the links 6 of the spoke sections 5 joined to the hub 2 are clamped to the spoke sections 4 joined by the links 6 to the ring 3 by means of bolts 7, and at the same time the generator plate 12 is clamped between the links 6.

We claim:

1. In a safety steering wheel (1) for street vehicles, such as passenger automobiles, in which a hub (2) is sunken below the plane of a ring (3) and in which there is integrated an air bag unit, comprising a gas generator (11), a support means (12) joined to the gas generator and fastened to a set of spokes, a gas bag (14) folded onto and/or around the gas generator, and a flange (13) clamped to the support means and clamping the gas bag to a marginal zone defining the gas entry port, while the areas of the spokes adjacent the ring have a jacket (8) and the air bag unit has a cap-like covering (10) of thermoplastic, polyurethane or thermoplastic elastomer, wherein the jacket (8) and the covering (10) merge materially into one another, the ring (3) as well as the hub (2) being joined by spoke sections (4, 5) between which an interlocking or bolt fastening is provided.

2. A safety steering wheel according to claim 1, wherein the spoke sections (5) joined to the hub (2) are configured as deformation means.

3. A safety steering wheel according to claim 1, wherein the spoke sections (5) each comprises a prismatic straight metal bar that is long in proportion to its transverse dimensions and which can be collapsed non-elastically by an axially acting pressure load in the direction of the axis of the greater principal moment of inertia, which has two broad sides and which at least on one of the two broad sides that is perpendicular to the axis of the greater principal moment of inertia has a graded serration so that in the case of the desired collapsing movement the teeth of the serrations will rest against one another.

4. A safety steering wheel according to claim 2, wherein the deformation means joining the spoke sections (5) to the hub (2) comprises a pot-like deformation element.

5. A safety steering wheel according to claim 2, wherein the deformation means joining the spoke sections (5) to the hub (2) comprises a tubular deformation member of sheet metal which has rhombic sections and whose grid-like structure forms a plurality of pairs of strips running from a common point, which result in helical windings of equal pitch and opposite pitch direction, the intersections of the pairs of strips being uniformly distributed over the circumference.

* * * * *